United States Patent [19]

Yoshimura et al.

[11] Patent Number: 4,904,079
[45] Date of Patent: Feb. 27, 1990

[54] LIQUID CRYSTAL DISPLAY DEVICE FOR OVERHEAD PROJECTOR

[75] Inventors: Makoto Yoshimura; Haruyoshi Hanada; Hirofumi Fukuoka, all of Osaka, Japan

[73] Assignee: Sharp Kabushiki Kaisha, Osaka, Japan

[21] Appl. No.: 338,412

[22] Filed: Jan. 13, 1989

Related U.S. Application Data

[63] Continuation of Ser. No. 84,586, Aug. 12, 1987, abandoned.

[30] Foreign Application Priority Data

Aug. 13, 1986 [JP] Japan .................................. 61-190239
Aug. 18, 1986 [JP] Japan .................................. 61-193157

[51] Int. Cl.$^4$ ............................................. G03B 21/00
[52] U.S. Cl. ............................. 353/122; 353/DIG. 3; 353/DIG. 5; 353/23; 353/60
[58] Field of Search ................... 353/DIG. 3, DIG. 4, 353/DIG. 5, 122, 57, 58, 60, 61, 22–24; 350/331 R, 333

[56] References Cited

U.S. PATENT DOCUMENTS

| | | | |
|---|---|---|---|
| 2,315,914 | 4/1943 | Wengel | 353/61 |
| 3,922,667 | 11/1975 | Ueda | 350/333 X |
| 4,257,695 | 3/1981 | Langworthy | 353/61 X |
| 4,652,101 | 3/1987 | Gaunwald | 353/DIG. 5 X |
| 4,824,210 | 4/1989 | Shimazaki | 353/122 X |

FOREIGN PATENT DOCUMENTS

2450417  4/1976  Fed. Rep. of Germany ........ 353/60

*Primary Examiner*—Harry N. Haroian
*Attorney, Agent, or Firm*—Flehr, Hohbach, Test, Albritton & Herbert

[57] ABSTRACT

A liquid crystal display device for an overhead projector has a light-transmissive liquid crystal display cell sandwiched between protective plates both from above and below. At least one of these protective plates is separated from the cell surface to form an air passage provided with a fan such that air can be caused to flow therethrough and come into direct contact with the cell. The cell can thus be cooled efficiently and the light of the projector can be increased for projecting a clearer image.

15 Claims, 3 Drawing Sheets

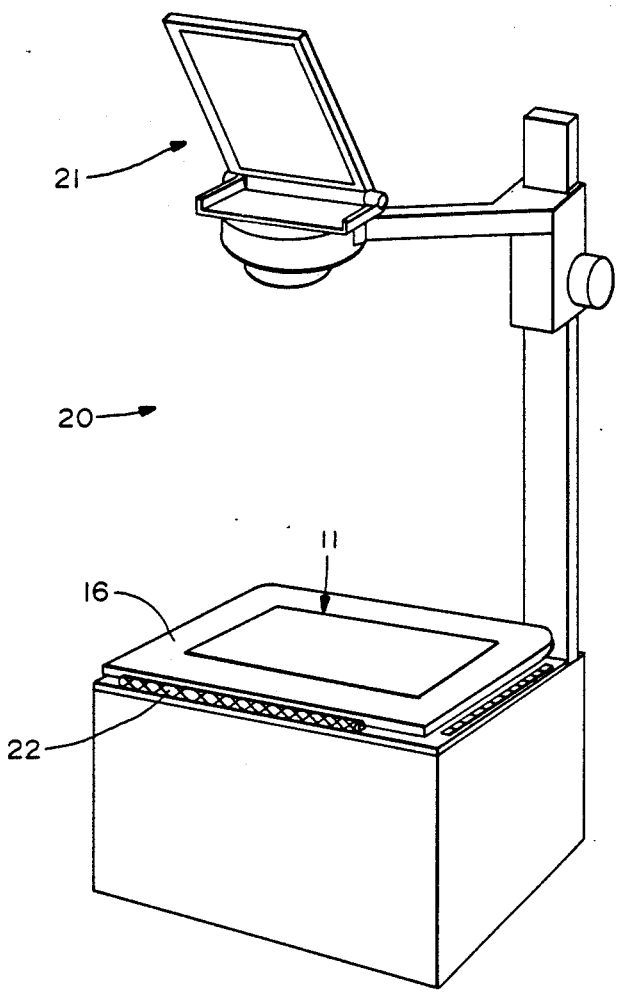
FIG.—1
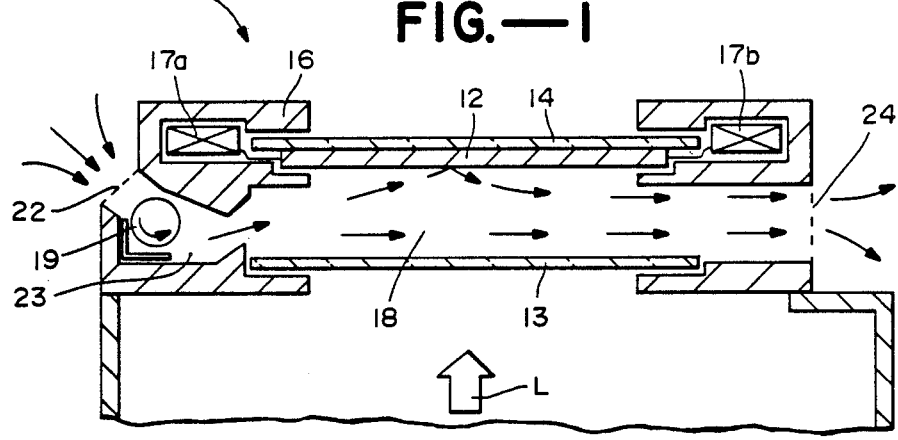
FIG.—2

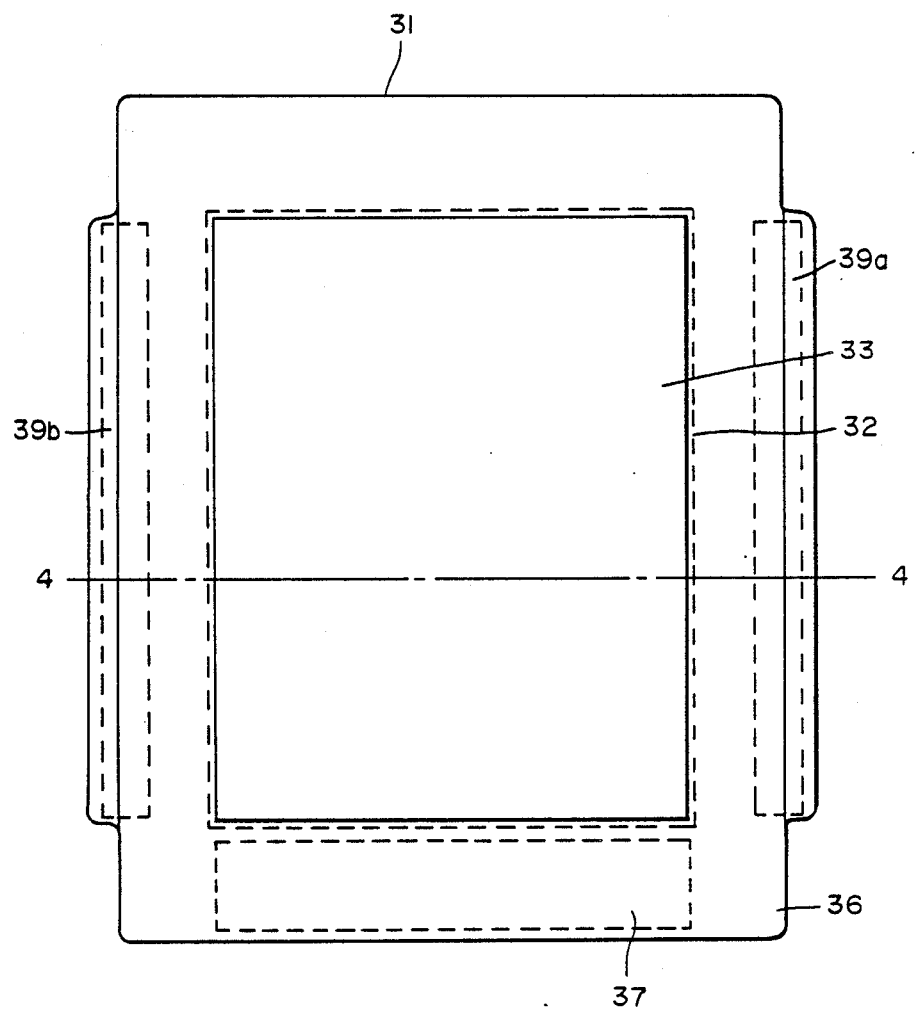
FIG.—3

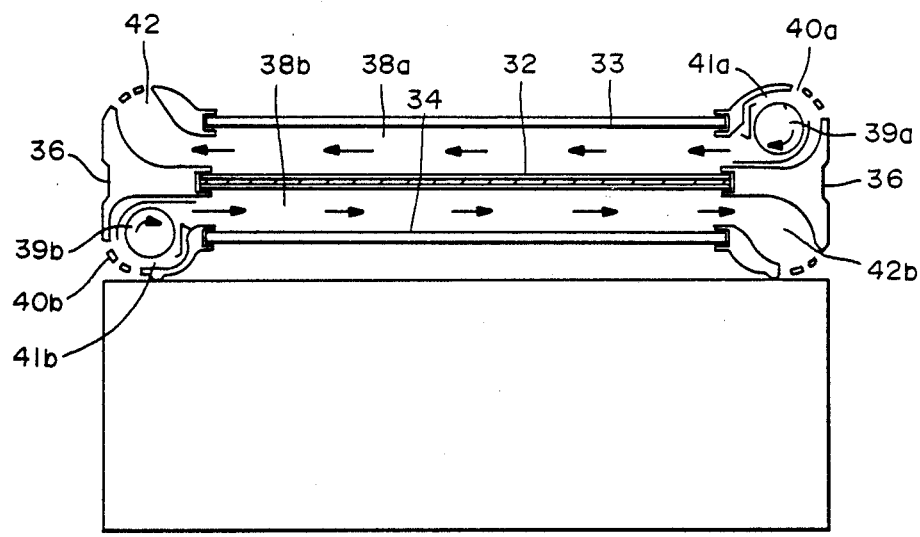
FIG.—4
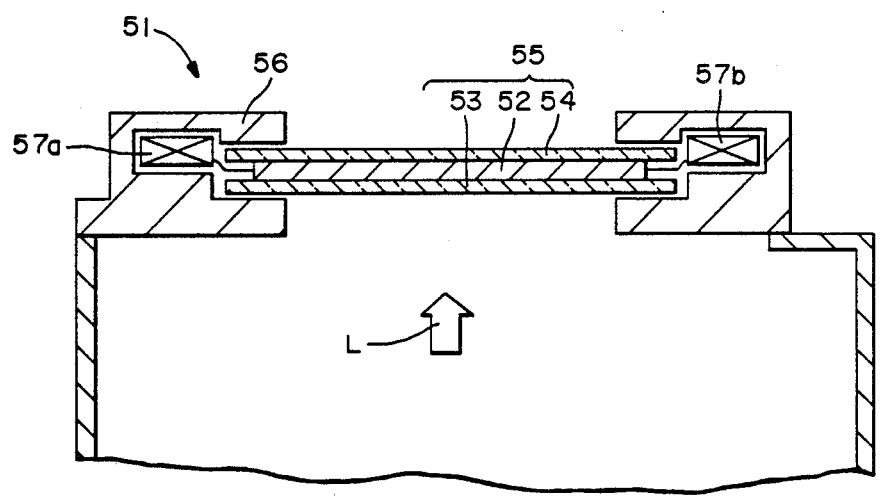
(PRIOR ART)
FIG.—5

LIQUID CRYSTAL DISPLAY DEVICE FOR OVERHEAD PROJECTOR

This is a continuation of application Ser. No. 084,586 filed Aug. 12, 1987, now abandoned.

BACKGROUND OF THE INVENTION

This invention relates to a liquid crystal display device for an overhead projector and more particularly to a liquid crystal display device for forming an image therein by using a personal computer or the like such that an enlarged display image thereof can be projected on a screen by means of an overhead projector.

As shown in FIG. 5, a conventional liquid crystal display device 51 for an overhead projector typically includes a light-transmissive liquid crystal display cell 52 with its upper and lower surfaces covered by protective filters 53 and 54 and a liquid crystal display panel 55 thus formed is supported in a horizontal position by a cabinet 56. Light is projected from below and passed through the liquid crystal display panel 55 such that an image formed on the display cell 52 is enlarged and projected onto a screen (not shown) by means of an optical system (not shown). Numerals 57a and 57b indicate circuits for operating the liquid crystal display cell 52.

With a conventional display device 51 thus structured, one cannot ignore the problem of controlling the rise in the temperature of the display cell 52 caused by the light beam. If the intensity of the light is too strong, the cell 52 becomes too hot and the contrast and color in the displayed image tend to become uneven. If the light is too weak, on the other hand, the projected image on the screen becomes too dark for clarity.

SUMMARY OF THE INVENTION

It is therefore an object of the present invention to provide an improved liquid crystal display device for an overhead projector which can prevent the temperature of the liquid crystal display cell from rising excessively and with which unevenness in contrast and color of the projected image can be avoided even if an intense beam of light is used.

The above and other objects of the present invention are achieved by providing a liquid crystal display device with a light-transmissive liquid crystal display cell sandwiched between protective filters in such a way that, according to one embodiment of the present invention, a gap is formed between the lower one of the protective filters and the display cell and, according to another embodiment of the present invention, gaps are formed on both sides of the display cell with the filters. These gaps serve to form air passages and a fan, or fans are also provided to cause air to flow through these gaps and to thereby directly and effectively cool the display cell.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings:

FIG. 1 is a perspective external view of an overhead projector incorporating a liquid crystal display device embodying the present invention, FIG. 2 is a schematic sectional view of a liquid crystal display device embodying the present invention for an overhead projector, FIG. 3 is a schematic plan view of another liquid crystal display device embodying the present invention, FIG. 4 is a schematic sectional view taken along the line 4—4 of FIG. 3, and FIG. 5 is a schematic sectional view of a conventional liquid crystal display device for an overhead projector.

DETAILED DESCRIPTION OF THE INVENTION

In FIG. 1, numeral 20 generally indicates an overhead projector provided with a liquid crystal display device 11 embodying the present invention such that light emitted from souce (not shown) which is disposed inside the projector 20 is passed through the display device 11 and the transmitted light is projected onto a screen (not shown) by means of an optical system 21 to obtain an enlarged image of the original drawn inside the display device 11. As shown in FIG. 2 which is a sectional view of the display device 11 for explaining its structure, the liquid crystal display device 11 is comprised of a combination of a light-transmissive liquid crystal display cell 12 and an upper protective filter 14 for protecting the upper surface of this cell 12. This combination is constructed in the form of a unistructural panel and is maintained in a horizontal position by a cabinet 16. The cabinet 16 also contains within itself driving circuits 17a and 17b for the display cell 12. A lower protective filter 13 for protecting the lower surface of the display cell 12 is also maintained horizontally by the cabinet 16 but by forming a gap with the lower surface of the cell 12. This gap is for forming an air passage 18 immediately below the cell 12. According to a preferred embodiment of the present invention illustrated in FIGS. 1 and 2, the cell 12 is the LM64025R manufactured with polarizing plates and twisted nematic liquid crystal and sold by the assignee corporation hereof with the dimensions 240 mm×160 mm×2.7 mm. The protective filters 13 and 14 are both of tempered glass and have the dimensions of 245 mm×177 mm×4 mm.

As shown in both FIGS. 1 and 2, the cabinet 16 is provided with an air inlet 22 at an upper peripheral part thereof and this air inlet 22 is connected to the air passage 18 through a fan room 23. As shown in FIG. 2, although not visible in FIG. 1, the cabinet 16 is also provided with an air outlet 24 at another upper peripheral part thereof opposite from the air inlet 22 such that it, too, is connected to the air passage 18. The fan room 23 contains a cylindrical fan 19 which is rotatable in the direction of the arrow shown in FIG. 2 such that when it thus rotates, outside air is sucked in through the inlet 22, passed through the air passage 18 and ejected out thereof from the outlet 24. According to the preferred embodiment referred to above, the cabinet 16 is 50 mm in height and the air outlet 24 is 20 mm in height.

As the air thus flows through the air passage 18, it comes into contact with the lower surface of the liquid crystal display cell 12 and serves to cool it directly. In other words, the rise in the temperature of the cell 12 caused by its exposure to light can be thereby controlled and hence the occurrence of unevenness in contrast and color of the image can be prevented. As a result, the exposure light can be intensified and the brightness of the projected image can be increased.

As shown in FIG. 1, the display device 11 is usually rectangular having longer edges and shorter edges. According to the embodiment described above, the rectangular opening of the cabinet 16 above and below the display cell 12 has the dimensions of 230 mm×140 mm. In such a situation, it is preferable from the point of view of cooling efficiency to cause the cooling air to flow inside the air passage 18 in the direction of the shorter edge, spreading sideways over the length of the longer edge. For this reason, it is particularly desirable to make use of a cylindrical fan having the length of this longer edge (or 230 mm in the case discussed above).

Another liquid crystal display device embodying the present invention which may be incorporated similarly into a projector as shown in FIG. 1 is shown in FIG. 3 which is its schematic plan view and FIG. 4 which is its schematic sectional view taken along the line 4-4 of FIG. 3. With reference the FIGS. 3 and 4, this liquid crystal display device shown generally at 31 is also comprised of a light-transmissive liquid crystal display cell 32 sandwiched between protective filters 33 and 34 respectively from above and from below and maintained horizontally by a cabinet 36 containing therein a circuit 37 for driving the display cell 32. The display device 31 according to this embodiment of the present invention is distinguishable from the one described above by way of FIGS. 1 and 2 in that not only the lower protective filter 34 but the upper protective filter 33 is also supported by the cabinet 36 so as not to be in direct contact with the display cell 32. In other words, the upper and lower protective filters 33 and 34 are supported by the cabinet 36 as shown in FIG. 4 such that an upper air passage 38a is formed between the upper protective filter 33 and the upper surface of the display cell 32 and that a lower air passage 38b is formed between the lower protective filter 34 and the lower surface of the display cell 32. An air inlet 40a connected to the upper air passage 38a through a fan room 41a is provided along an edge on the upper surface of the cabinet 36 and another air inlet 40b connected to the lower air passage 38b through another fan room 41b is provided along another edge on the lower surface of the cabinet 36 such that the two inlets 40a and 40b are at opposite sides of the cabinet 36 as shown in FIG. 4. Each of the air passages 38a and 38b ends at an air outlet 42a or 42b provided along the opposite edge of the cabinet 36 with respect to the corresponding air inlet 40a or 40b. Inside each fan room 41a or 41b is a cylindrical fan 39a or 39b disposed rotatably such that air can be caused to flow in opposite directions inside the air passages 38a and 38b as shown by series of arrows in FIG. 4. In other words, as the fans 39a and 39b are rotated, air is sucked in from outside through the air inlets 40a and 40b, passed through the air passages 38a and 38b and ejected out again through the air outlets 42a and 42b.

The air, thus caused to travel through the air passages 38a and 38b, comes into contact with the upper and lower surfaces of the display cell 32 and thereby serves to directly cool it. The cooling can be effected uniformly since the air flows in opposite directions in the upper and lower air passages 38a and 38b. This has the desirable effect of controlling the rise in the temperature of the display cell 32 caused by its exposure to light. Moreover, since the air inlet 40a and outlet 42a for the upper air passage 38a are facing upward and the air inlet 40b and outlet 42b for the lower air passage 38b are facing downward, warm air discharged from the outlets 42a and 42b is not directed towards the inlets 40a and 40b. A preferred embodiment of the present invention described above utilizes a cell and filters as described in connection with FIGS. 1 and 2 and the air passages 38a and 38b are both 20 mm in height.

Advantages gained by liquid crystal devices of the present invention include the following:

(1) cooling effect is improved because the surfaces of the light-transmissive liquid crystal display cell are directly and uniformly cooled;

(2) air is effectively circulated and small fans are sufficient for use because air passages are formed only where cooling is required;

(3) no additional parts are required for the construction because the protective filters for the display cell are used to form the passages; and (4) the projected image can be made brighter to prevent unevenness in contrast or color in the projected image because the rise in the temperature of the liquid crystal display cell can be prevented by the cooling.

What is claimed is:

1. In an liquid crystal display device for an overhead projector with a light-transmissive liquid crystal display cell placed below an upper protective plate and above a lower protective plate, the improvement wherein said liquid crystal display and said lower protective plate form therebetween an air passage for a unidirectional air flow therethrough from an inlet opening to an outlet opening, said device comprising a fan disposed inside a fan room which connects to said air passage through said inlet opening, said air passage at said inlet opening being so shaped that said fan causes air entering said air passage through said inlet opening to be blown directly on said display cell.

2. The device of claim 1 wherein said fan is a cylindrical fan.

3. The device of claim 1 wherein said liquid crystal display cell is generally rectangular in shape, having a longer edge and a shorter edge, and said air passage is so formed that said air flow is in the direction of said shorter edge.

4. In a liquid crystal display device for an overhead projector with a light-transmissive liquid crystal display cell placed below an upper protective plate and above a lower protective plate, the improvement wherein said liquid crystal display cell and said lower protective plate form therebetween a lower air passage and said liquid crystal display cell and said upper protective plate form therebetween an upper air passage and wherein said device further comprises means for causing unidirectional air flows in mutually opposite directions through said lower and upper air passages.

5. The device of claim 4 wherein said flow causing means include a first fan for causing air to flow through said lower air passage and a second fan for causing air to flow through said upper air passage.

6. The device of claim 5 wherein said first and second fans are cylindrical fans.

7. The device of claim 5 wherein said first and second fans are so positioned with respect respectively to said lower and upper air passages and said upper and lower air passages are so formed that said first and second fans cause air to be directly blown on said liquid crystal display cell both from above and from below.

8. The device of claim 5 wherein said liquid crystal display cell is generally rectangular in shape, having a longer edge and a shorter edge, and said upper and lower air passages are so formed that air flows therethrough by said fans in the direction of said shorter edge.

9. The device of claim 5 wherein said lower air passage has inlet and outlet openings in downward direction and said upper air passage has inlet and outlet openings in upward direction.

10. The device of claim 1 wherein said fan is so disposed with respect to said air passage as to cause said air flow exclusively through said air passage inside said device.

11. The device of claim 4 wherein said flow causing means are so disposed with respect to said air passages as to cause said unidirectional air flows inside said device exclusively through said upper and lower air passages.

12. The device of claim 5 wherein said first and second fans are so disposed with respect to said air passages as to cause air to flow inside said device exclusively through said lower and upper air passages.

13. The device of claim 6 wherein said first and second fans are disposed at intake end openings of said lower and upper air passages, respectively.

14. The device of claim 1 wherein said liquid crystal display cell is a twisted nematic liquid crystal cell.

15. The device of claim 4 wherein said liquid crystal display cell is a twisted nematic liquid crystal cell.

* * * * *